March 20, 1934.  H. KARL  1,951,574
METHOD OF WORKING IN THE REPRODUCING ARTS
Filed Oct. 4, 1930
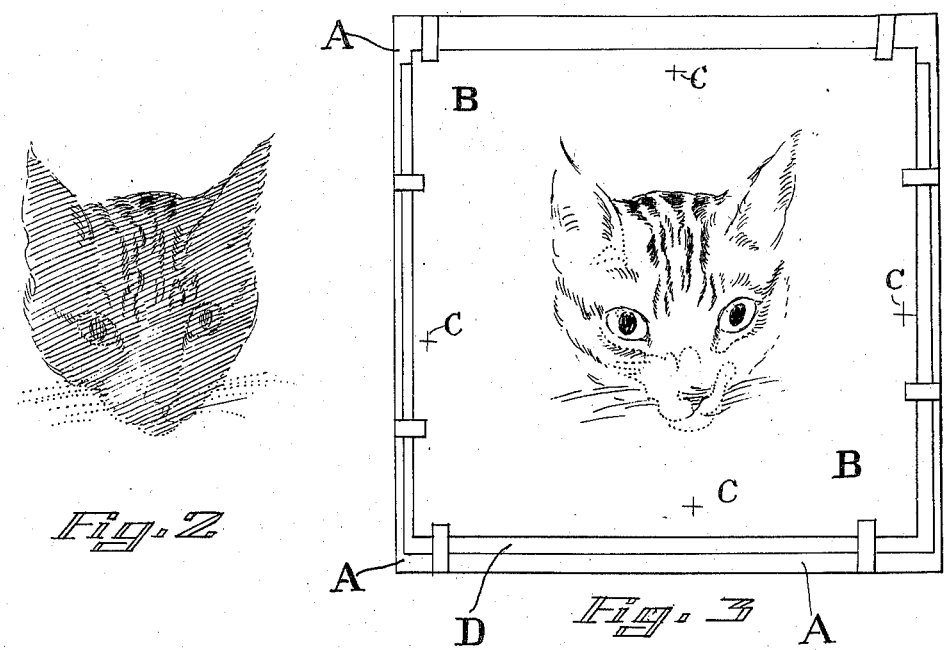
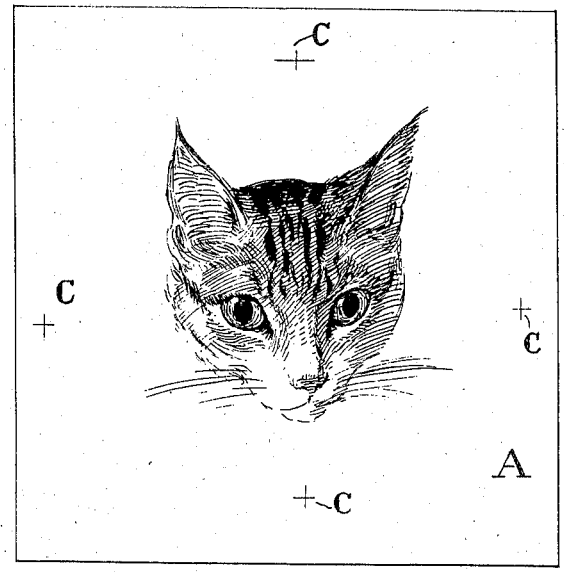
Inventor
Heinrich Karl Patented Mar. 20, 1934

1,951,574

UNITED STATES PATENT OFFICE 1,951,574

METHOD OF WORKING IN THE REPRODUCING ARTS

Heinrich Karl, Jersey City, N. J.

Application October 4, 1930, Serial No. 486,516

6 Claims. (Cl. 95—5.1)

This invention relates to improvements in a new method of working in the reproducing arts, such as the photolithographic and the photo-engraving trades or others in which the original copies are to be photographed chiefly for reproducing purposes. With my improved system it is possible to finish or nearly finish a negative right in the photographic camera so that it can be used for making the positive either on stone or on the metal plate without or with only little addition or retouching afterwards, or that it can be used right by the transferer or for any kind of transfer machine.

More particularly my system consists in the various steps described subsequently, of which some are already known in the art, and which, first, include the use of a transparent means already known, such as a pane of glass, or a sheet of gelatine, but most preferably of a folio or sheet of celluloid that is to be prepared first to allow that water colors or oil colors adhere and smoothly lay on which otherwise is not possible and for taking the excessive shine off one of the sides of the glass, gelatine, or celluloid without impairing the transparency. Furthermore, the placing of that glass, gelatine, or celluloid before the sketch that is to be reproduced and to fasten it in a suitable manner. Furthermore, to emphasize by painting or drawing on that glass, gelatine, or celluloid in such manner as it is necessary for obtaining the desired effect on the negative, as, for instance, by painting completely white or of suitable color that part that is to appear light or much lighter on the black or color plate than it would be if the copy or sketch would be photographed without the glass, gelatine, or celluloid, and to paint on the glass, gelatine, or celluloid in black or other dark color and in any necessary shade those parts of the sketch that need emphasizing on the black plate or color plate when the negative would not give such depth in certain places when exposed in the usual manner. Furthermore, to simply lay a white or suitably colored sheet of paper right behind that glass, gelatine, or celluloid in their whole extent or only to an extent as is necessary for cutting out the design or tints or any parts that are not desired or that might come too strong (open) on the negative. Furthermore, the use of glass, gelatine, or celluloid that is not completely white or that is only translucent or colored in any shade for obtaining certain general effects on the negative that may be either a black plate or a color plate negative. Furthermore, the novel method of removing said transparent means, if necessary, for allowing the sketch or original copy to be exposed again to the same negative in the camera for a certain time. Furthermore, the novel method of removing painted or drawn parts, or of parts previously covered with white, from said transparent means for allowing a further exposure of more parts of the original copy to the negative being still in the camera. Furthermore, the use of said glass, gelatine, or celluloid for opaquing or staining instead of doing it on the negative and placing it on the negative when the black or color plate is to be made, thus saving the negative for other work or purposes or colors if desired.

In the illustration of this method or process, Figure 1 represents the copy which is to be reproduced;

Figure 2 represents a flat positive or photograph from the picture on the copy of Figure 1, which flat positive is not satisfactory either in the values of the several tints, or in the depths; and Figure 3 shows the transparent means, such as a pane of glass, or a sheet of gelatine, or of celluloid, placed in front of the copy of Figure 1 and held thereto with adhesive tape, showing also that the deep parts in the design of the copy of Figure 1 are drawn on that transparent means and that other parts are painted over with white, so that, first, only the depths will be exposed to the negative in the camera, perhaps without the screen before the negative, whereupon the painted white, or some of it, will be washed off to allow the photographing of more parts of the original copy of Figure 1, either with or without the screen; there is also shown that, in addition to the painting over with white, a sheet of white or colored paper is placed between the original copy and the transparent means for cutting out design or tints until the first photographic exposure is made.

Those skilled in the art either in the lithographic or photo-engraving business know that the preparing or retouching of the negative is essential for obtaining a good print on stone or metal or for direct exposure on the transfer plate. This refers also to all reproducing methods in which the original copy is to be photographed.

There are various methods employed for retouching the negative which are, in general, called the glass process. There is, for instance, one method for preventing the light to pass less strongly through certain parts on the negative and this is by staining or otherwise painting or retouching the negative with transparent red or other colors. There are also modes for preparing the negative for letting the light come through stronger in parts than it would be the case on the non-retouched negative. The opaquing of the negatives is necessary for obtaining completely clean parts on the plates and this is also still necessary when the method of the present invention is employed; superfluous tints, however, may be removed afterwards from the plate itself.

In accordance with this method of working, the sketch A (see Figure 1 of the drawing) will be handed first to the artist, either the lithographic artist or the photo-engraver etc. as the case may be, and, according to the mode of reproduction that is desired. The artist then examines the sketch to find out the parts that need painting or drawing on the glass, gelatine, or celluloid B (see Figure 3 of the drawing). There may be also certain wishes by the customer that necessitate corrections or the lighter or darker coloring of parts that will be reproduced. If such is the case, the artist takes that glass, gelatine, or celluloid B and places it on the sketch A (see Figure 3). Even pastel sketches will not suffer if this procedure is made right. The artist may pull the cross marks C, or he may indicate certain parts that correspond with the sketch, so that the glass, gelatine, or celluloid B may be placed again in its correct place on the sketch A when it will be photographed. The artist will proceed to do black and white just as it will be necessary for obtaining the right shades on the negative. One of the great advantages with this system is that, whenever the artist should have made a mistake, he can readily wash away with water the parts that are not made right if he uses water colors. If he uses oil colors he simply needs to take turpentine or gasoline or benzine instead of the water for washing away the parts that are not made right. In many cases it may be necessary to wash away painted or drawn parts on said glass, gelatine, or celluloid B after a photographic exposure has been made during a fraction of time of the entire exposure that is needed for making the correct negative. In this instance, reference is made to Figure 3, in which is shown that only the depths of the picture on copy A (Figure 1) are drawn and all the lights or medium tints are covered with white, and that in addition to this a sheet of paper D is placed between the original copy A and the transparent medium B for covering also such parts which have not been painted over with white, as it might be the case with certain details.

As soon as a sufficiently long exposure of the depths seen in Figure 3 is made to the negative in the photographic camera (this exposure might be made in the method in which continuous tone negatives are made, that is, without any screen), no further exposure will be made until the stronger greys of the picture on copy A are laid bare on the transparent medium B which will be obtained by washing off the white painted or blown on with the air-brush on those parts of the transparent medium B which correspond with the stronger greys of the picture on copy A. This can be obtained with a brush, or, if larger parts must be washed off, a piece of cotton will be more advantageous. It may be necessary to make more than two exposures to the same negative in the photographic camera for obtaining a still greater graduation of the tints whereby the artist has to wash off successively the white painted on those parts of the transparent medium B which correspond with lighter shades of grey or color of the picture on copy A, until only the areas of white are left which are circumscribed by the dotted lines shown in Figure 3. It is also evident that such pieces must be cut out from the sheet D which correspond with parts washed off on the transparent medium B. Finally, the transparent medium B, together with sheet D, may be taken off entirely for a final, relatively short exposure of the picture on copy A to the same negative in the photographic camera, so that also the correct modulation of the light parts in the picture can be obtained on the negative.

It is thus shown that, whenever strong tints or drawing is desired on a black or color plate, the parts on the transparent medium B which correspond with the parts on which the strong tints, or drawing, are desired must be left free from the beginning, or the white covering these parts must be washed off right after the first short exposure which is to be made for obtaining the greatest depths.

In many instances, it may suffice to simply lay the white sheet of paper D between the copy A and the transparent medium B, and that paper may be removed after the greatest depths are photographed, such as shown in Figure 3, so that also the general design may be exposed to the same negative in the photographic camera.

Formerly, the depths of the picture have been emphasized by the artist on the plate, either on the stone or on the metal plate, by using crayon or lithographic tusche. This retouching, also called artists' or hand work, is often objected to because, in most instances, it does not harmonize with the other parts of the picture. The present invention makes the retouching on stone or plate unnecessary and the picture will acquire the harmony that is essential for a good reproduction because the depths, as well as the lighter parts, show the uniform texture as obtained by the screen, or by the plain photograph. If the sketch A demands a texture like that obtained by pastel colors, it is simply necessary to roughen the surface coating of the glass, gelatine, or celluloid B whereby it will be possible to draw thereon with pencil or crayon. The roughening of the coating may be made by adding pumice powder or fine sand to the ingredients of this surface coating. There are several ingredients that might be used for making the coating, the most preferable in the instance where water colors are to be used is to take the white of an egg, or of several of them just according to the extent of the work that is to be done, and to mix it with water to a thickness that suits best as a coating that leaves a certain transparency through the glass or celluloid B. For gelatine it is best to use oil colors and to prepare the surface with materials such as oil, turpentine, or benzine, etc. because gelatine is soluble in water. Since gelatine shrinks or extends easily, it is preferable to use the celluloid sheet instead.

It can be said that each sketch gives a certain problem that must be solved. After the artist has painted the several glasses, gelatines, or celluloid sheets B which each is intended for a certain color, if, for instance, a color reproduction is to be made, the original sketch or copy will be given to the photographer together with said painted or drawn glasses, or gelatine or celluloid folios B. The latter may represent those that serve for making the yellow, red, blue and black negatives if a four color job is to be made and the number of these painted glasses or gelatine or celluloid sheets or folios B will be greater the more colors that are to be used for a particular job. There may be glasses, or gelatine or celluloid sheets that must be removed from the sketch after a certain exposure to the camera so that also a photographic exposure of the sketch to the same negative can be made without said glass, gelatine, or celluloid B. For certain color plates the photographic exposure might be made with the painted glass, gelatine, or celluloid B in front of the sketch during all the time of the exposure. This will be chiefly in connection with blacks or other dark colors because in most instances there is too much tint obtained or not enough snap in the drawing when the sketch is photographed without the painted or drawn glass, gelatine, or celluloid B. The fact that even harsh touches come softer on the half-tone negative permits it that the artist can work very contrastively. He may work with black and white alone (although he may use colors that suit him) and after a certain experience in that work he will be able to paint the right tint in gray, although the sketch shows a tint in color, say yellow or pink or blue etc. He may then indicate by writing also which of the said painted glasses, gelatines or celluloids B need half exposure or less and which have to stay before the sketch during the whole exposure or nearly whole exposure. After all the colors are thus so prepared in advance, the sketch with the painted glasses, gelatines, or celluloid sheets B will be handed to the photographer and he will photograph the work as indicated and he will use color filtration as is well known when color work is at hand. There will be a great simplification and the obtaining of good results in case of black and white work. It is also a great advantage that the half-tone dot will be concrete and correctly shaped no matter how fine it is. In case that certain color plates need still some lighter shades in parts, it is customary to shade these parts of the negative with a mask while the color or black plate or print on stone is being made, or to stain the negative with red or other colors before the print is made. In the latter case in which the negative has been stained, it cannot be rendered any more so as to acquire its former qualities and therefore it must be regarded as spoiled, and in the former case it is not always the right way for obtaining the desired lighter shades because also depths will be lighter too. For excluding all these inconveniences, said glass, gelatine, or celluloid is to be used also in connection with the reduction of tints in the case where the negative is already made and that it is found that certain tints must be still lighter on the plate or stone than they would be obtained with the negative that has not been shaded. Said glass, gelatine or celluloid will be laid on the negative and those parts painted black or with opaque that need still lighter tints. When the print on stone or plate will be made the glass, gelatine or celluloid will be left half time or a fraction of time of the whole exposure and then removed so that a tint will still be printed on the parts that need such lighter tint. I can go even as far as to employ colored glasses, gelatines or celluloid sheets and use them for the color filtration even in addition to the existing system with emphasizing those parts with light color that need lighter coloring and such parts with dark colors that need strong photographing and these painted or drawn parts on said colored glass or gelatine or celluloid may be washed away again after a fraction of time of the whole photographic exposure.

It is also advisable to use not completely transparent glasses, gelatines or celluloid sheets for certain works that need indistinct drawing which sometimes is necessary, for instance on subjects with a dark color and one or several so-called tints, and in this instance it would be one of the tints that need the translucent, that is, not the completely transparent glass, gelatine or celluloid.

With the aid of said glass, gelatine or celluloid it is possible to make two negatives for one color plate, as, for instance, a halftone-negative and a line negative whereby the line negative will give the solids in the strongest places of the color plates. For the line negative there may be a special glass, gelatine or celluloid employed. I know that gelatine or celluloid sheets have been used heretobefore for making tracings of outlines or for keys which have then been photographed especially (but not exclusively) when a reduction in size from that of the original copy was demanded and I know also that plates from such outlines or keys are utilized sometimes in whole or in part for a drawing color or for any other suitable color.

In my invention, however, the glass, gelatine or celluloid is not merely used for making a key but it is directly placed before the original copy and so used for making the particular color right on the negative.

I am aware that it has been proposed to place celluloid sheets, or other transparent medium, before a monochrome and to paint upon these celluloid sheets the entire color combination which suits best for coloring that photograph, etc. The latter method may suffice for work which does not demand a correct or so-called facsimile reproduction of the original copy (a painting, etc.) and all the fine qualities thereof. It may serve for simply giving some color effect to a monochrome.

I am also aware that a celluloid sheet, or other transparent medium, has been covered with a tint of stippled or mechanical dots or lines, etc. and placed before the original drawing which consists chiefly of outlines, and that parts of said tint have been removed for obtaining the lights in the picture, whereupon the original sketch together with the tint have been photographed.

This latter method may also serve to advantage for work which does not require the qualities of a facsimile reproduction of any kind of originals, such as sketches, paintings, etc., as it will be obtained with my improved process. I know that translucent glasses or celluloid sheets are used for making animated cartoons, etc. for moving pictures, but the process in connection therewith differs greatly from that which is claimed here below, because, first, the transparent medium is not used for copying originals and, therefore, is not placed before a copy, and all those described steps will not be employed as set forth in this specification.

What is claimed is:

1. The method of reproducing copies with a known transparent means which has two even surfaces, and which is placed before the copy that is to be reproduced, of painting those parts with light color on the outer surface of that means which correspond with parts of the copy that must be photographed lighter than those seen on the copy, and painting those parts darker on the surface of said means which correspond with those parts on the copy that should be photographed stronger as they are actually seen on the copy, removing said means from the copy after a fraction of the time used for the entire photographic exposure for making the negative, exposing said copy to the negative in the camera for obtaining a certain amount of the tints and general design of the copy, and making a print on stone or plate from said finished negative.

2. The process of reproducing copies with the aid of a known transparent means with two even surfaces placed before the copy that is to be reproduced and having a transparent coating on one of said surfaces, the emphasizing of those parts with light color that need to be photographed lighter than actually seen on the copy, and the emphasizing of those parts with dark color that are to be photographed comparatively darker than they would be if the copy would be photographed without said painted or drawn-on means, and the placing of a sheet of white material behind said means to the extent that demands cutting out tints and design not wanted on the color or black plate and so exposing said means to the negative in the photographic camera.

3. The process of reproducing copies with the aid of a known transparent means with two even surfaces placed before the copy that is to be reproduced, emphasizing the parts with dark color that have to be photographed stronger as they comparatively would appear when the copy would be photographed without said means, placing a sheet of white paper to the desired extent behind said transparent means and leaving it there for a fraction of the time used for the entire photographic exposure, and then removing it for allowing still some tint and drawing of the copy to be photographed although in a lighter shade than actually seen on the copy.

4. The process of reproducing copies with the aid of a known transparent means with two even surfaces placed before the copy that is to be reproduced, emphasizing those parts with light color that need to be photographed lighter and painting or drawing those parts dark that need to be emphasized with darker shade of color, removing such drawn or painted parts on said means after a fraction of the time used for the entire photographic exposure, and exposing said so treated means in front of the copy again to the negative in the camera and repeating this procedure when still more drawn or painted parts must be removed from said means, and finally exposing the copy to the same negative in the camera without said painted or drawn-on means.

5. The process of reproducing copies with the aid of a known transparent means with two even surfaces placed before the copy that is to be reproduced, of emphasizing those parts with light or dark color that need such lighter or darker photographing, coloring or taking one of said means that is colored in such color as to cause a color filtration for a certain color plate negative and coloring others of the said means each in another color, or taking such already colored means and placing one after another before the copy for the filtration of the other colors to be used for the reproduction of said copy, and coating said other means and drawing and painting on them with such colors as to emphasize the values such as the light and dark parts of the copy.

6. The process of reproducing copies with the aid of a known transparent means, placing said means on the negative, tinting with transparent yellowish red color those parts of said means which correspond with such parts on the negative that must be reduced in strength, laying said negative together with said means on the sensitized place or stone, and making a print thereon.

HEINRICH KARL.